United States Patent [19]

Denison

[11] 4,275,029
[45] Jun. 23, 1981

[54] METHOD FOR MANUFACTURING CONCRETE BRICK IN BLOCK LIKE ARTICLES AND FORMING SHIPPING PACKS THEREFROM

[75] Inventor: Don E. Denison, Paris, Tenn.

[73] Assignee: Lingl Corporation, Paris, Tenn.

[21] Appl. No.: 44,935

[22] Filed: Jun. 4, 1979

[51] Int. Cl.³ .............................................. B29H 7/04
[52] U.S. Cl. ...................................... 264/152; 100/3; 206/322
[58] Field of Search ........................ 206/322; 264/152; 25/1 D, 2; 100/3

[56] References Cited

U.S. PATENT DOCUMENTS

| | | | |
|---|---|---|---|
| 2,536,377 | 1/1951 | Lachaise | 25/1 D |
| 2,869,721 | 1/1959 | Baumer | 206/322 |
| 3,189,175 | 1/1965 | Cruckshank | 206/322 |

Primary Examiner—V. P. Hoke

Attorney, Agent, or Firm—Larry S. Nixon; Peter W. Gowdy

[57] ABSTRACT

An improved manufacturing procedure for making slices or layers used to form shipping packs of concrete brick or block like articles. Such slices or layers, a plurality of which are used to form a shipping pack of bricks, are prepared according to the present invention by forming individual articles in a particular way on forming boards prior to curing. By making this specific arrangement of articles on the forming board prior to curing which arrangement corresponds to the form and number of lateral and longitudinal rows as are desired to ultimately appear in each slice of a shipping pack shipping packs are quickly and easily formed. After curing, it is only necessary to compact and, when necessary, strap the layer in its compacted condition. Thereafter, each layer or slice can be used directly to form a shipping pack without further handling or regrouping of individual brick or block like articles in each layer.

7 Claims, 2 Drawing Figures

METHOD FOR MANUFACTURING CONCRETE BRICK IN BLOCK LIKE ARTICLES AND FORMING SHIPPING PACKS THEREFROM

BACKGROUND OF THE INVENTION

At present there are known systems by which bricks can be manufactured and processed to the point of being formed into shipping packs. In one such known process bricks are placed on their edges on curing boards. The curing boards are usually filled in order to cure as many bricks as possible at one time and following curing the bricks are unloaded with standard gripping devices and placed onto grouping tables where they are tilted and regrouped for subsequent stacking procedures.

In this regard attention is directed to the following commonly assigned patents: U.S. Pat. Nos. 3,625,375, 3,603,466 and 3,717,264 which show apparatus and methods for unloading brick layers and for forming stacks.

Bricks are, of course, rather fragile and brittle commodities so that during handling, breakage and damage can very likely occur. Thus, where bricks are frequently moved from one forming area to another or moved from one arrangement to another, such multiple handling operations serve only to increase the likelihood that damage will occur to bricks thereby creating seconds as well as lost time in having to inspect bricks prior to shipment.

SUMMARY OF THE PRESENT INVENTION

The present invention aids in eliminating multiple handling steps of concrete bricks or blocks and at the same time improves the efficiency of such manufacturing operations. Specifically, the improved method eliminates otherwise necessary operating steps in forming shipping stacks of concrete bricks or blocks following curing.

The present invention relates primarily to forming shipping packs or cubes of concrete bricks or blocks in a highly efficient manner. Shipping packs are formed from a plurality of vertical slices or layers which have been grouped and bound together. The present invention concerns a method which begins by forming concrete bricks or blocks on forming boards in a particular manner prior to curing. The present invention also comprises an improved method for quickly and efficiently forming shipping stacks from these layers following curing.

According to the present invention, the bricks or blocks in each layer or slice are manufactured on the forming boards in a predetermined manner so that a predetermined number of longitudinal and lateral rows, including where necessary, the proper formation and location of tine rows or courses, are formed. The number of bricks or blocks in each row and the number of rows will be the same in form and number as is desired for each slice or vertical layer of the finally formed shipping pack.

It should be understood that a shipping pack is formed from a plurality of slices with each slice containing a plurality of bricks arranged in a particular manner in both longitudinal and lateral rows. By initially manufacturing concrete bricks in a particular manner on forming boards, the bricks, after curing, can be easily compacted into their final slice condition and be ready for use in constructing shipping packs. Depending on the size and/or shape of the concrete bricks or blocks, each slice may not need to be strapped in the compacted condition. Accordingly, by employing the method according to this invention multiple handling steps of concrete bricks or blocks previously required following curing are no longer necessary and shipping packs in their desired condition can be formed directly from the manufactured layers following curing.

The method relates initially to the manufacturing of bricks or blocks directly on forming boards and employs the initial step of forming individual bricks or blocks on the forming board so that they stand on their ends. A mold is placed on the forming board and the concrete bricks or blocks are formed after which the mold is removed. Spaces are thus left between individual bricks to allow proper curing to proceed. Where tine rows are required in the shipping pack there will be included in the layer or slice being formed, and a veneer board, necessary to support the bricks above the spaces provided in the tine course, can be added either before or after curing by any convenient means such as by manually placing the board in the space between the tine row and the row of bricks there above. Following the correct placement of the veneer board and curing, it is possible to compact the layer of bricks or blocks on the forming board and, if necessary strap them together in that compacted form. Thereafter the layer can be transferred by any known means, directly to a shipping pack forming area where they can be arranged in place. When a predetermined number of such layer or slices have been arranged next to one another the final pack can be strapped or otherwise held together.

The present invention is more specifically set forth in conjunction with the following figures wherein:

FIG. 1 is a perspective view of one slice or layer of bricks showing an exemplary arrangement of the bricks in the form of rows or courses on a forming board; and FIG. 2 is a perspective view of a shipping pack formed from a plurality of the slices shown in FIG. 1.

DETAILED DESCRIPTION OF THE PRESENT INVENTION

Figure 1:
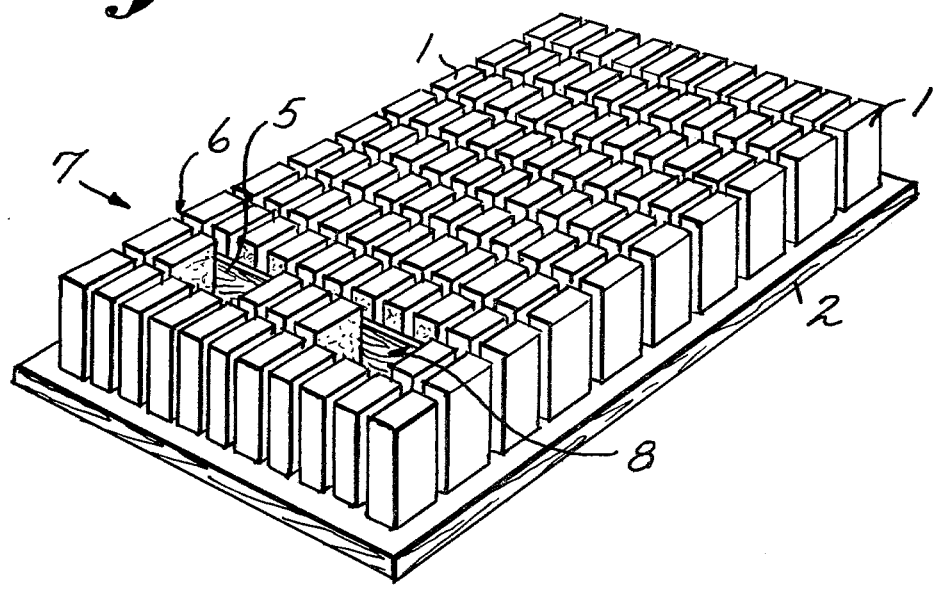
Figure 2:
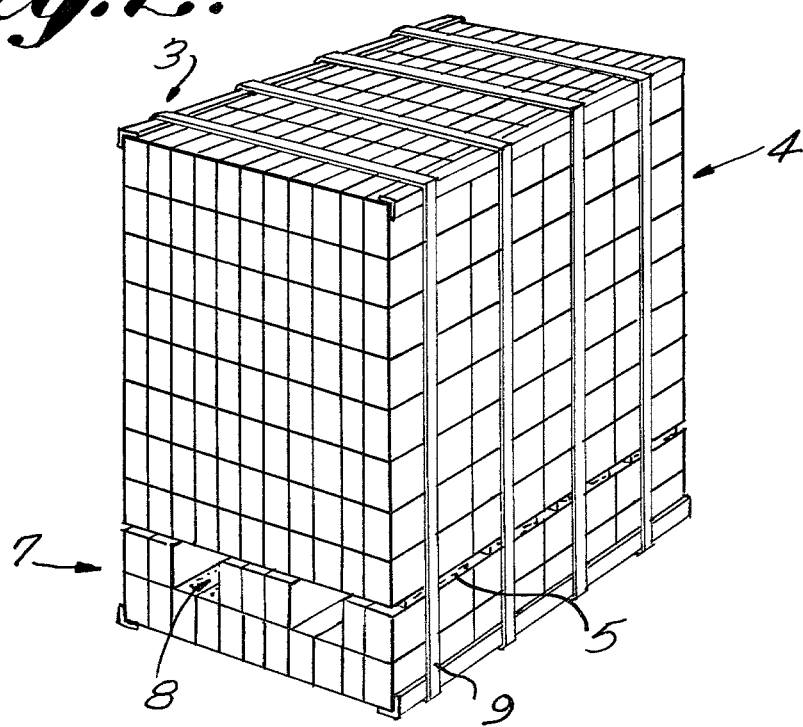

Turning our attention to FIGS. 1 and 2, one exemplary arrangement in which a slice can be formed is shown as being formed from concrete bricks. It should be understood that other shapes of concrete bricks or blocks also can be employed. Individual bricks 1 are shown following molding. Each lies on an end face on the forming board 2 and together comprise a slice, generally indicated by numeral 3. As shown in FIG. 2, a plurality of slices 3 have been grouped together in the form of a shipping pack, generally indicated at 4.

Each of the bricks 1 are spaced from one another both longitudinally and laterally to allow curing to proceed in an efficient manner. As shown in FIG. 1, the particular layer being formed includes a tine course, generally indicated at 7. In this exemplary embodiment, each of the ten courses or rows include eleven bricks. The tine course, however, includes only seven since the row omits the third, fourth, eighth, and ninth bricks counting from either the right or left hand side of the row. The omission of these four bricks creates two voids, generally indicated at 8 when the shipping pack is ultimately formed. These voids in each slice will, together, form openings extending through the pack into which the tines of a forklift truck can pass. The veneer board 5 is placed between the tine course 7 and the course just above that course in order to keep the bricks above the voids 8 from falling into these voids when the slice is raised into a vertical position.

Following curing the slice can be formed into the final slice condition by compacting or moving the individual bricks together or by tilting the slice followed by bringing the bricks together in the form shown in FIG. 2. When necessary the slices can be strapped by straps 9 as shown in FIG. 2 to maintain that compacted condition.

When a number of such slices 3 have been formed they can be arranged vertically next to one another and formed into a shipping pack. Each pack can then be held together in any conventional manner such as by boards or shrink wrap film. Since each slice in the embodiment shown includes voids 8 when the shipping pack is completed holes for tines will be automatically formed. In a like manner, the desired overall construction of the shipping pack will be quickly and easily created.

While the invention has been described in connection with what is presently conceived to be the most practical and preferred embodiment, it is to be understood that the invention is not to be limited to the disclosed embodiment but on the contrary, is intended to cover various modifications and equivalent arrangements included within the spirit and scope of the appended claims, which scope is to be accorded the broadest interpretation of such claims so as to encompass all such equivalent structures.

What I claim is:

1. In a method of forming shipping packs of brick or block like objects formed from a plurality of vertical slices the improvement comprising forming individual slices, that will form each of the vertical slices, in a horizontal condition prior to curing by molding the brick or block like objects in a spaced apart condition on a curing board in the same configuration as desired for each vertical slice of the shipping pack, curing the brick or block like objects, moving the block like objects on the forming board next to one another into a vertical shipping pack slice, placing the vertical slice in its vertical position and forming a shipping pack from a plurality of such vertical slices.

2. A method as in claim 1 wherein the step of molding brick or block like objects on a curing board includes the step of forming a tine course and prior to moving the bricks into a compacted slice the further step of introducing a veneer board between the tine course and the course positioned next thereabove.

3. A method as in claim 1 wherein the brick or block like objects are comprised of a concrete composition.

4. A method as in claim 1 wherein the step of forming a shipping pack includes the step of positioning a plurality of vertical slices adjacent one another and binding the plurality of vertical slices together.

5. A method of preparing layers of brick or block like articles for use in forming vertically oriented layers for use in shipping packs comprising the steps of forming individual articles on a forming board so as to produce a plurality of lateral and longitudinal rows equal to the pattern and number of rows desired for the vertical layer in the shipping pack, forming one of the rows adjacent one end of the layer into a tine row by omitting bricks from two predetermined spaced apart areas on the board, curing the bricks while on the forming board, inserting a veneer board between the tine row and the next adjacent row away from the one end, compacting the bricks together and securing the bricks in the compacted condition.

6. A method as in claim 5 wherein the veneer board is inserted prior to curing.

7. A method of preparing a vertically oriented layer of bricks for forming a shipping pack comprising the steps of forming individual bricks into a horizontal layer on a forming board in a predetermined arrangement corresponding to the arrangement desired to be created in each vertical layer of the shipping pack, curing the bricks while on the forming board, compacting the bricks together, securing the bricks in the compacted condition and placing the horizontally formed layer in its vertical condition.

* * * * *